United States Patent [19]
Kuriki

[11] Patent Number: 5,848,663
[45] Date of Patent: Dec. 15, 1998

[54] ACTIVE ENGINE MOUNT SYSTEM EFFECTIVE IN CONTROLLING VERTICAL MOTION OF A VEHICLE BODY

[75] Inventor: Nobuharu Kuriki, Wako, Japan

[73] Assignee: Honda Giken Kogyo Kabushiki Kaisha, Tokyo, Japan

[21] Appl. No.: 575,856

[22] Filed: Dec. 20, 1995

[30] Foreign Application Priority Data

Dec. 27, 1994 [JP] Japan .................................... 6-338061

[51] Int. Cl.$^6$ ..................................................... B60K 1/00
[52] U.S. Cl. ........................ 180/300; 280/707; 548/550; 180/902; 267/140.14
[58] Field of Search ........................... 280/707; 248/550; 180/300, 902; 267/140.14

[56] References Cited

U.S. PATENT DOCUMENTS

| | | | |
|---|---|---|---|
| 4,869,474 | 9/1989 | Best et al. ................................ | 267/136 |
| 5,052,510 | 10/1991 | Gossman ................................. | 180/300 |
| 5,062,497 | 11/1991 | Ogata ..................................... | 180/300 |
| 5,303,798 | 4/1994 | Nakamura et al. ................. | 180/300 X |
| 5,360,080 | 11/1994 | Yamazaki ............................... | 180/300 |
| 5,409,078 | 4/1995 | Ishioka et al. .......................... | 180/300 |
| 5,533,597 | 7/1996 | Nezu et al. ......................... | 280/207 X |
| 5,609,353 | 3/1997 | Watson .................................... | 280/207 |
| 5,619,413 | 4/1997 | Ookley ............................... | 280/707 X |

FOREIGN PATENT DOCUMENTS 599262 4/1993 Japan .

*Primary Examiner*—Christopher P. Ellis
*Attorney, Agent, or Firm*—Carrier, Blackman & Associates, P.C.; Joseph P. Carrier; William D. Blackman

[57] ABSTRACT

An active engine mount system for supporting an engine on a vehicle body is used for controlling the vertical movement of the vehicle body produced by irregularities of the road surface. The engine mount system comprises an actuator interposed between the engine and the vehicle body for applying a vertical force to the vehicle body so that the vertical acceleration of the vehicle body for each given condition of the road surface may be minimized by adjusting a contribution of the mass of the engine to the mass of the vehicle body. The engine mount system may consist of a full active or semi active mount system. By detecting the road condition ahead of the vehicle, a particularly favorable result can be achieved.

20 Claims, 9 Drawing Sheets frequency response ($\ddot{X}_2/X_0$)

(a)

(b)

(c)

(d)

(e)

(f)

(g)

frequency response ($\ddot{X}_2/X_0$)

ACTIVE ENGINE MOUNT SYSTEM EFFECTIVE IN CONTROLLING VERTICAL MOTION OF A VEHICLE BODY

TECHNICAL FIELD

The present invention relates to an active engine mount system for automobiles, and in particular to an active engine mount system employing an actuator which can control the vertical movement of the vehicle body by vertically actuating the engine relative to the vehicle body, and can thereby improve the ride quality of the vehicle.

BACKGROUND OF THE INVENTION

An active wheel suspension system is normally interposed between the vehicle body and a wheel, and controls its stroke between the vehicle body and the wheel according to the running condition of the vehicle. A full active wheel suspension system positively controls the suspension stroke with its actuator. A semi active suspension system controls only the damping property of the suspension system.

According to an active wheel suspension system, in particular a full active suspension system, the vertical force acting on the vehicle body is detected as an acceleration, and the suspension stroke is controlled according to the detected acceleration. Thereby, the vertical movement of the vehicle due to irregularities of the road surface can be substantially reduced as compared to the more conventional passive suspension system. If the vertical movement of the vehicle body is predicted by detecting the condition of the road surface ahead of the vehicle, or analyzing the running condition of the vehicle, a further improvement of the ride quality of the vehicle can be achieved.

However, such an active wheel suspension system is effective in controlling the oscillation of the vehicle in a range of frequency near the resonant frequency of the sprung mass (the mass of the vehicle body), but is often inadequate for controlling the oscillation of the vehicle near the resonant frequency of the unsprung mass (the mass of the wheel and components rigidly attached to it). This may be explained as follows.

Suppose that the vertical movement of the vehicle may be expressed by a two mass system as illustrated by a lower portion of FIG. 1. Here, it is assumed that the mass of the unsprung mass is $M_1$, the displacement of the unsprung mass is $x_1$, the mass of the sprung mass is $M_2$, the displacement of the sprung mass is $x_2$, the spring constant of the tire is $k_1$, the coordinate of the road surface is $x_0$, and the force acting between the sprung mass and the unsprung mass is f, then, $$M_2(d^2x_2/dt^2)=f$$

$$M_1(d^2x_1/dt^2)=-f-k_1(x_1-x_0).$$

Hence, $$M_1(d^2x_1/dt^2)+M_2(d^2x_2/dt^2)=-k_1(x_1-x_0) \quad \text{Equation (1)}$$

By conducting Laplace transformation to this dynamic equation, one obtains $$-M_2\omega^2 x_2+(-M_1\omega^2+x_1)=k_1 x_0 \quad \text{Equation (2)}$$

where the Laplacian variable $s=j\omega$. If the following transfer functions for an input from the road surface ($x_0$) are defined, $$H_1=(x_1-x_0)/x_0$$

$$H_2=(d^2x_2/dt^2)/x_0,$$

Equation (1) can be expressed as $$-M_2 H_2+(-M_1\omega^2+k_1)H_1=M_1\omega^2 \quad \text{Equation (3)}$$

Therefore, when $\omega_1^2=k_1/M_1$, the transfer function of the vertical acceleration of the vehicle body can be given by $$H_2(\omega_1)=k_1/M_2 \quad \text{Equation (4)}$$

It means that the gain of the transfer function $H_2$ at the resonant frequency of the unsprung mass is determined solely by the mass of the sprung mass $M_2$ and the spring constant of the tire $k_1$, and even an active suspension system cannot reduce the gain. This has seriously limited the effectiveness of an active suspension system (FIG. 7). This also means that the ride quality of the vehicle can be improved by varying the sprung mass $M_2$ and the spring constant $k_1$ of the tire, but it is difficult to change these quantities when the vehicle is running.

By noting these facts, the inventor realized that the engine accounts for a significant part of the sprung mass. It is proposed in Japanese patent laid-open publication No. 5-99262 to actively move the vehicle engine vertically relative to the vehicle body for the purpose of controlling the oscillation of the engine, and the inventor realized that this may be modified so as to control the vertical movement of the vehicle suspension system instead of the vertical movement of the engine mount system.

BRIEF SUMMARY OF THE INVENTION

In view of such problems of the prior art, and based on such a realization by the inventor, a primary object of the present invention is to provide an improved active engine mount system which is capable of improving the ride quality of the vehicle by making use of the mass of the engine.

A second object of the present invention is to provide a system which is capable of controlling not only the vertical vibration of the vehicle body near the resonant frequency of the sprung mass but also the vertical vibration of the vehicle body near the resonant frequency of the unsprung mass.

These and other objects of the present invention can be accomplished by providing an active engine mount system for supporting an engine on a vehicle body, comprising: a wheel suspension system supporting the vehicle body on a wheel; an actuator interposed between the engine and the vehicle body for vertically displacing the engine relative to the vehicle body; and control means for adjusting a contribution of a mass of the engine to a mass of the vehicle body so as to control a vertical acceleration of the vehicle body according to a given condition of a road surface. The control means controls the actuator to achieve the adjustment, and will also preferably include prediction control means for detecting a road condition ahead of the vehicle.

By thus vertically displacing the engine with the actuator, the resulting reaction is applied to the vehicle body whereby the mass of the engine can be added to or subtracted from the mass of the vehicle body as desired, and a vertical motion of the vehicle body can be controlled. In particular, by suitably changing the effective mass of the vehicle body (the sprung mass), it is possible to control the vibratory motion of the vehicle body near the resonant frequency of the wheel (the unsprung mass). The engine mount system may consist of either a semi active or full active engine mount system.

In particular, by detecting a road condition ahead of the vehicle, it is possible to favorably control the actuator of the engine mount system, and a substantial improvement over the conventional active wheel suspension system can be accomplished. For instance, the actuator may be used to apply a sky hook force, or a force substantially proportional to a vertical velocity of the vehicle body, to the vehicle body.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
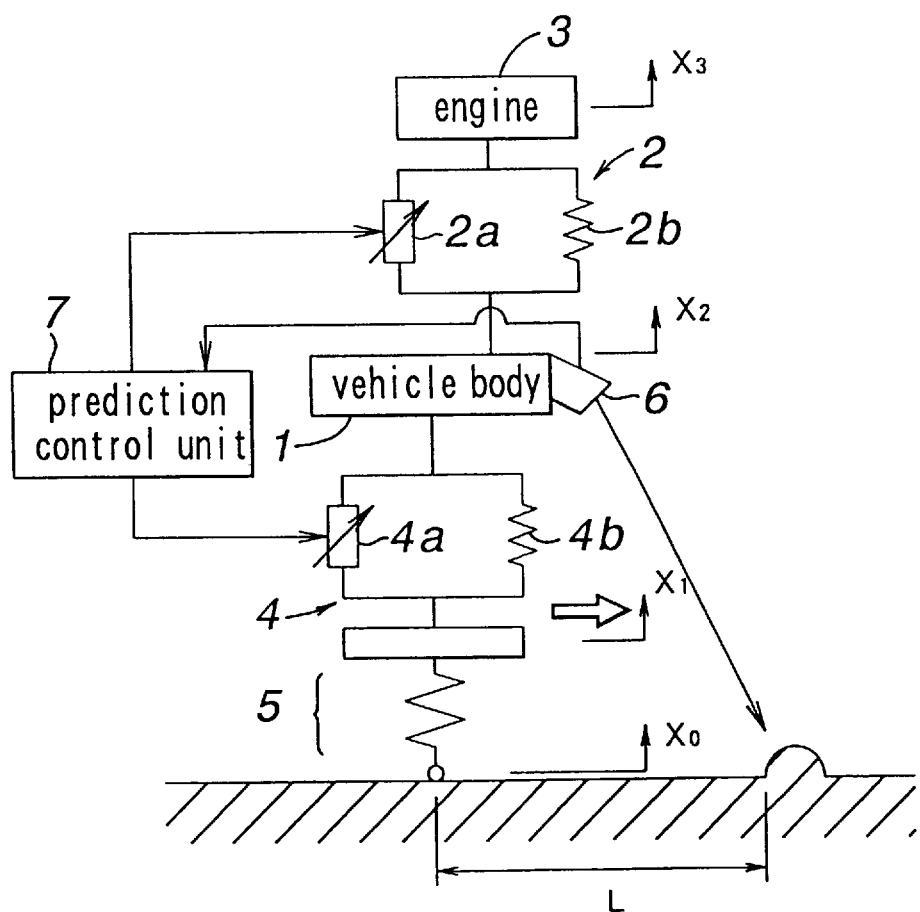
FIG. 1 is a diagram showing a first embodiment of the active engine mount system according to the present invention.

FIG. 1 schematically illustrates a vehicle suspension system and an engine mount system given as a first preferred embodiment of the present invention. In this embodiment, a semi active engine mount system is combined with a semi active wheel suspension system. An engine 3 is mounted on a vehicle body 1 via an engine mount system 2. A wheel 5 is supported at a lower part of the vehicle body 1 via a wheel suspension system 4. The vehicle 1 is additionally provided with a sensor 6 for continually detecting the condition of the road surface ahead of the vehicle, and the output of this sensor is supplied to the prediction control unit 7. This sensor may consist of a remote sensor using laser, light, sound or other radiation energy, or alternatively may consist of a sensor associated with the front wheels for detecting data for controlling the wheel suspension system for the rear wheels. The prediction control unit 7 is designed to control both the engine mount system 2 and the wheel suspension system 4.

The engine mount system 2 comprises a variable damper 2a which can selectively vary its damping coefficient according to a command signal from the prediction control unit 7, and a spring 2b connected in parallel with the damper 2a. Similarly, the wheel suspension system 4 comprises a variable damper 4a which can selectively vary its damping coefficient according to a command signal from the prediction control unit 7, and a spring 4b connected in parallel with the damper 4a.

Figure 2:
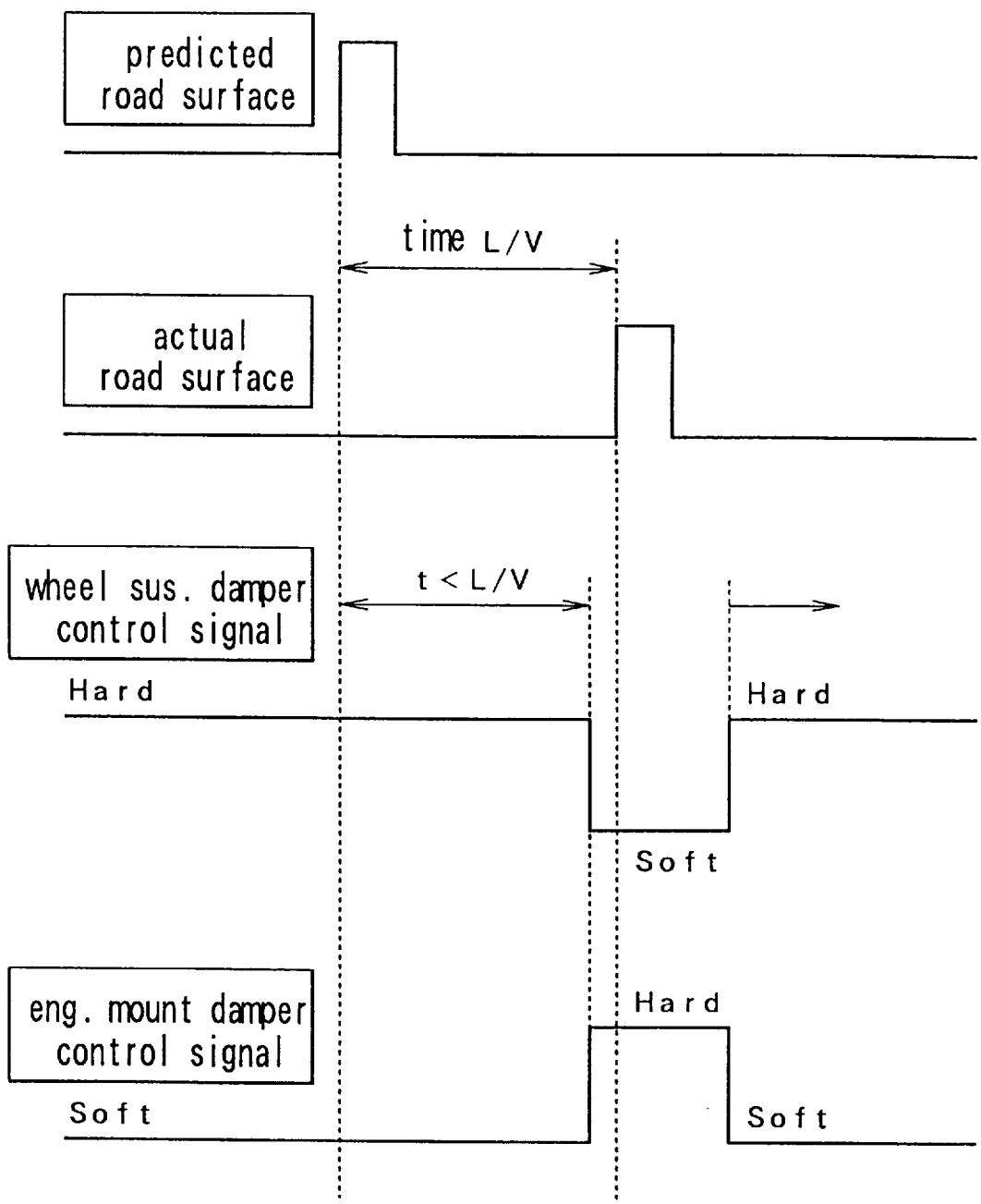
FIG. 2 is a time chart showing the control action of the engine mount system of FIG. 1.

In this embodiment, when a projection is detected ahead of the vehicle by a distance L by the sensor 6, the sensor 6 produces a command signal which softens the damping property of the variable damper 4a of the wheel suspension system 4, and hardens the damping property of the variable damper 2a of the engine mount system 2. By hardening the variable damper 2a for the engine mount system 2, the engine 3 becomes relatively rigidly attached to the vehicle body 1, and the effective sprung mass of the vehicle thereby increased. After the vehicle has ridden over the projection, the damping coefficients of the variable dampers 2a and 4a of the engine mount system 2 and the wheel suspension system 4 are both restored to their normal values which are effective in controlling the subsequent transient oscillation of the vehicle body. This is illustrated in the time chart of FIG. 2.

When the vehicle speed is V, the wheel reaches the projection in a time period L/V. Therefore, the variable dampers 2a and 4a are required to be adjusted after elapsing of the time period L/V following the detection of the projection, but, in reality, to compensate for the delay in the responses of the variable dampers 2a and 4a, they are adjusted slightly before the elapsing of the time period L/V.

Figure 3:
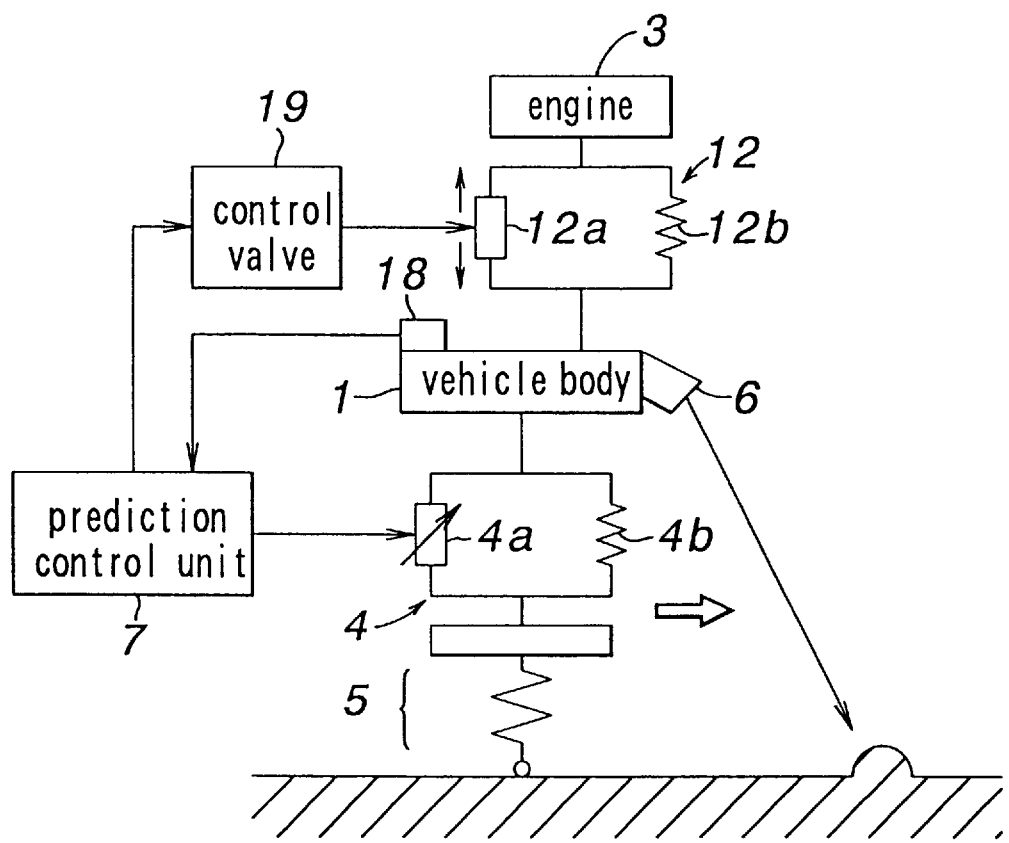
FIG. 3 is a diagram showing a second embodiment of the active engine mount system according to the present invention.

FIG. 3 shows a vehicle suspension system and an engine mount system given as a second preferred embodiment of the present invention. The parts corresponding to those of the previous embodiment are denoted with like numerals. In this embodiment, a semi active wheel suspension system is combined with a full active engine mount system. The engine mount system 12 employs an hydraulic actuator 12a for producing a sky hook force as described hereinafter, instead of a variable damper. An acceleration sensor 18 is mounted on the vehicle body 1 for measuring the vertical acceleration of the vehicle body 1, and the output of the acceleration sensor 18 is supplied to a prediction control unit 7 which controls the hydraulic actuator 12a of the engine mount system 12 via a control valve 19. The prediction control unit 7 is otherwise similar to that of the previous embodiment.

According to this embodiment, the wheel suspension system 4 is controlled similarly as that of the first embodiment. The engine mount system 12 or, more particularly, the prediction control unit 7 detects the absolute vertical velocity of the sprung mass (vehicle body) by integrating the output of the acceleration sensor 18, and causes the hydraulic actuator 12a to produce a force (sky hook force) proportional to the absolute vertical velocity of the sprung mass by taking advantage of the inertia of the mass of the engine. Thus, the mass of the engine 3 can be added to the mass of the vehicle body at an appropriate timing and by an appropriate amount, and the effective sprung mass of the vehicle can be increased.

Figure 4:
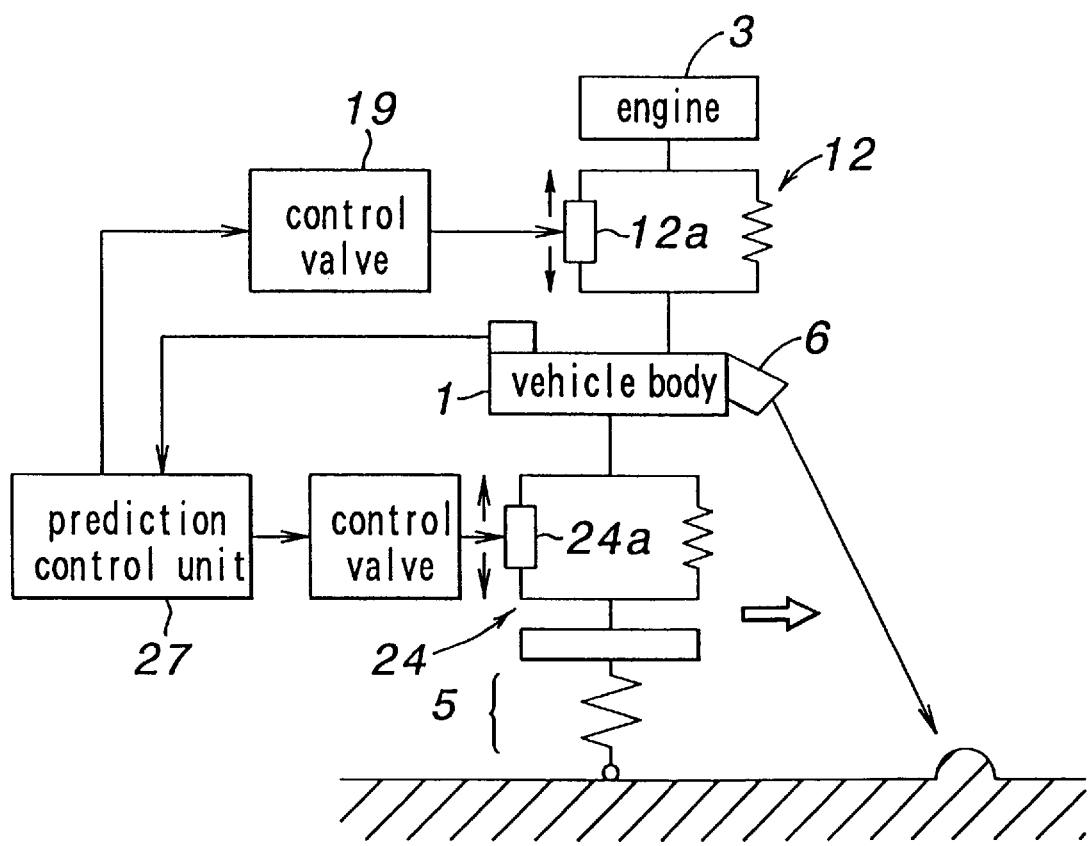
FIG. 4 is a diagram showing a third embodiment of the active engine mount system according to the present invention.

FIG. 4 shows a vehicle suspension system and an engine mount system given as a third preferred embodiment of the present invention. The parts corresponding to those of the previous embodiments are denoted with like numerals. In this embodiment, a full active wheel suspension system is combined with a full active engine mount system. The wheel suspension system 24 employs an hydraulic actuator 24a for producing an actuating force based on prediction as described hereinafter, instead of a variable damper. The overall system structure is otherwise similar to that of the previous embodiment.

According to this embodiment, the engine mount system 12 is controlled similarly as the second embodiment. As for the wheel suspension system 24, the hydraulic actuator 24a produces a vertical actuating force based on the predicted absolute value of the vertical velocity of the sprung mass (the mass of the vehicle body) $M_2$. The movement of the unsprung mass is predicted by the prediction control unit 27, and based on this prediction, the actuating force cancels the influences of this movement by intervening between the vehicle body 1 and the wheel 5. As this control process cannot entirely cancel the vibration of the vehicle body 1 at the resonant frequency of the unsprung mass, the hydraulic actuator 12a dynamically changes the sprung mass (vehicle mass) when riding over the projection so as to cancel the oscillatory movement of the vehicle body at the resonant frequency of the unsprung mass.

Figure 5:
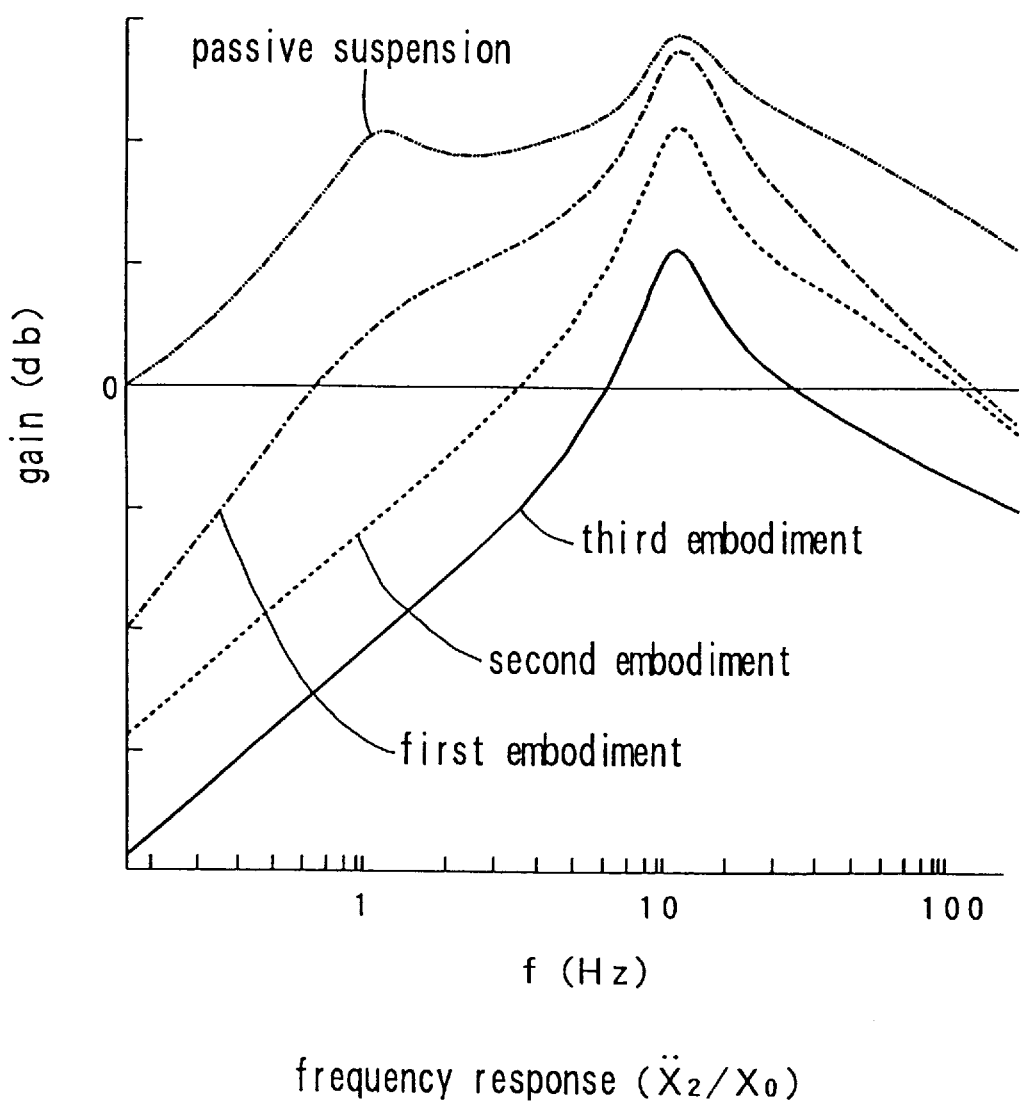
FIG. 5 is a graph comparing the frequency responses of the preferred embodiments of the present invention with the frequency response of the conventional system.
Figure 7:
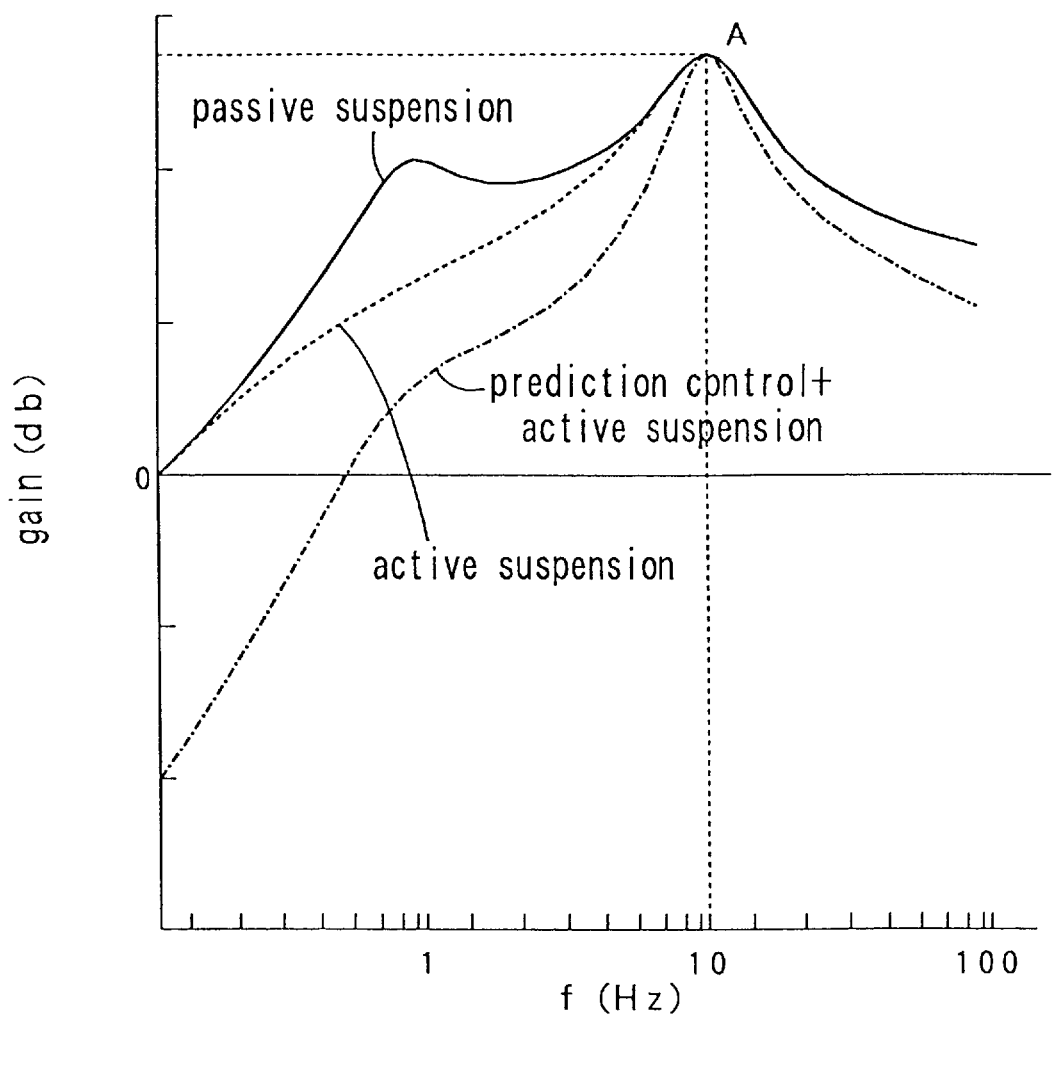
FIG. 7 is a graph comparing the frequency responses of a conventional passive suspension system, a semi active suspension system, and a full active suspension system.

FIG. 5 is a graph comparing the frequency responses of the first to third embodiments with that of a conventional passive wheel suspension system. As can be seen from this graph, the embodiments of the engine mount system according to the present invention can control the vertical oscillation of the vehicle over a wide range including the resonant frequency of the unsprung mass. As shown in FIG. 7, the conventional suspension systems, be it passive full active or semi active, has a limited capability to control the vertical oscillation of the vehicle near the resonant frequency of the unsprung mass.

The semi active engine mount system cannot increase the sprung mass by more than the mass of the engine, but the full active engine mount system can increase the sprung mass by more than the mass of the engine, and can therefore significantly reduce the gain of the vertical acceleration of the vehicle body to the input from the road surface. FIGS. 6a to 6g show the transient responses of various combinations of a wheel suspension system and a wheel suspension (FIGS. 6b to 6g) for a given input from the road surface (FIG. 6a) as summarized in the following table.

TABLE (FIG. 6)

| | |
|---|---|
| conventional | (a) input from the road surface |
| | (b) passive wheel suspension |
| | (c) semi active wheel suspension |
| | (d) prediction control + semi active wheel suspension |
| present invention | (e) prediction control + semi active wheel suspension + semi active engine mount |
| | (f) prediction control + semi active wheel suspension + full active engine mount |
| | (g) prediction control + full active wheel suspension + full active engine mount |

Figure 6:
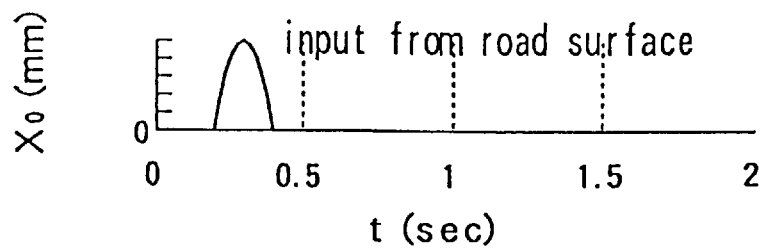
FIGS. 6(a) to 6(g) are graphs showing a given input from the road surface and responses of different systems to this input.
Figure 6:
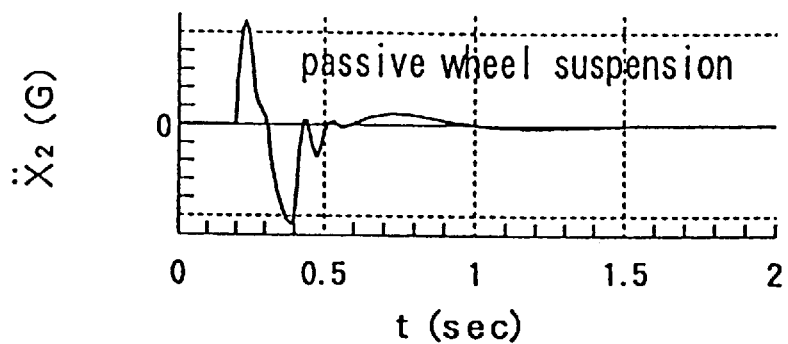
Figure 6:
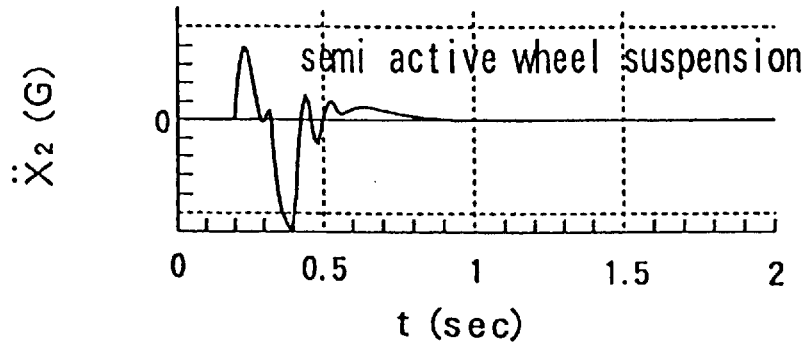
Figure 6:
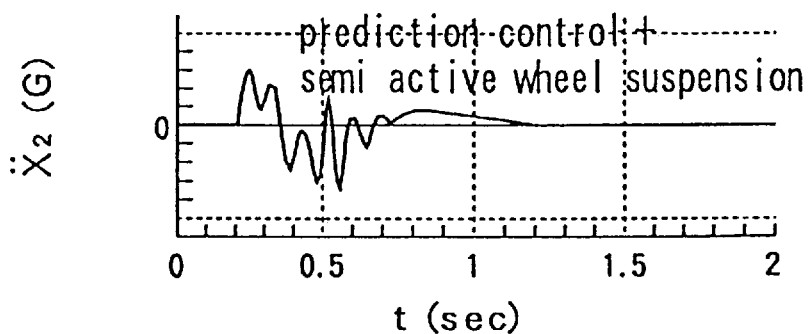
Figure 6:
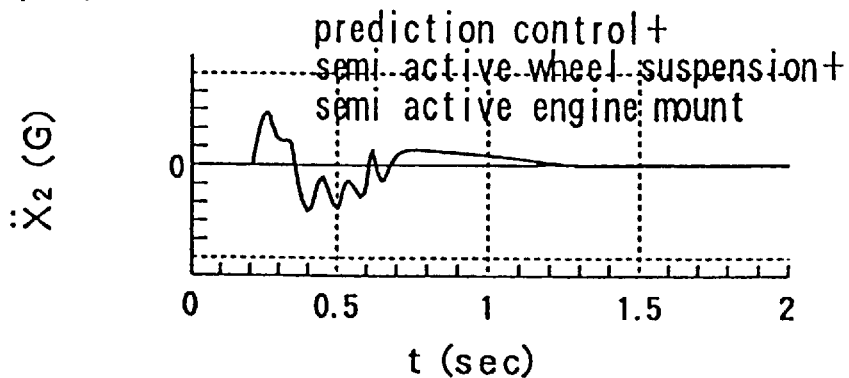
Figure 6:
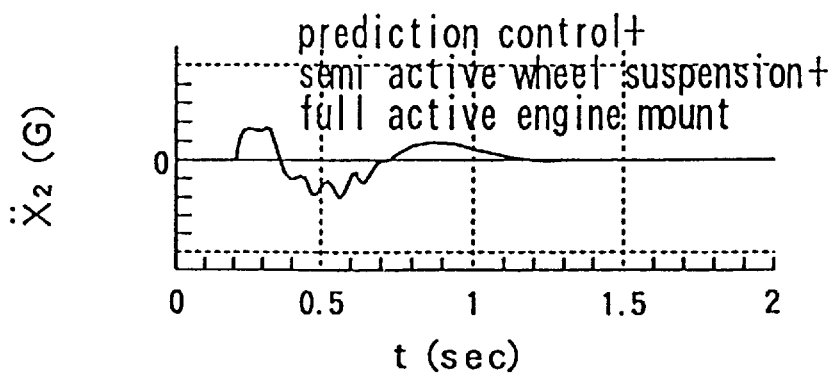
Figure 6:
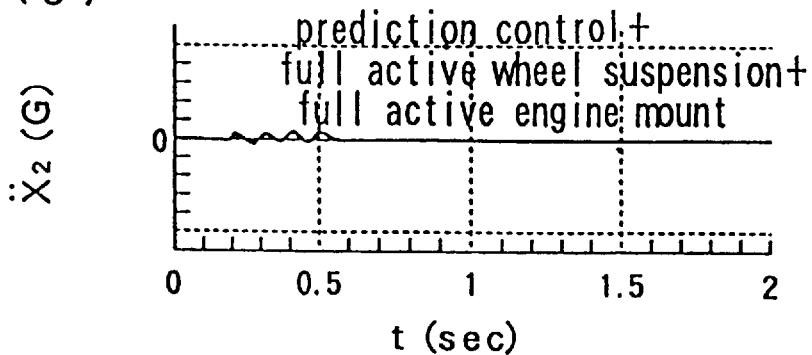

As can be seen from the graphs of FIG. 6, the third embodiment is highly effective in not only providing a low gain but also in controlling the transient oscillation of the vehicle body after riding over the projection. The first embodiment consumes least power. The second embodiment consumes relatively small power but is significantly more effective in improving the ride comfort of the vehicle.

Thus, according to the active engine mount system of the present invention, by controlling the contribution of the mass of the engine to the effective mass of the vehicle body, the effective or dynamic sprung mass can be instantaneously varied as desired, and the vertical oscillation of the vehicle body near the frequency component near the resonant frequency of the unsprung mass, which depends on the sprung mass $M_2$ and the spring constant of the tire $k_1$, can be reduced with the result that the ride comfort of the vehicle can be significantly improved. By controlling the actuator according to the detected road condition ahead of the vehicle, the response delay of the system can be favorably compensated, and the responsiveness of the vehicle can be improved. Further, by combining this engine mount system with an active wheel suspension system, a compounded favorable result can be achieved in improving the ride comfort of the vehicle.

Although the present invention has been described in terms of preferred embodiments thereof, it is obvious to a person skilled in the art that various alterations and modifications are possible without departing from the scope of the present invention which is set forth in the appended claims.

What I claim is:

1. An active engine mount system for supporting an engine on a vehicle body, comprising:

a wheel suspension system supporting said vehicle body on a wheel;

an actuator interposed between said engine and said vehicle body for vertically displacing said engine relative to said vehicle body; and control means for adjusting a contribution of a mass of said engine to a mass of said vehicle body so as to control a vertical acceleration of said vehicle body according to a given condition of a road surface;

said control means comprising prediction control means for detecting a road condition ahead of said vehicle.

2. An active engine mount system according to claim 1, wherein said engine mount system consists of a semi active engine mount system.

3. An active engine mount system according to claim 1, wherein said engine mount system consists of a full active engine mount system.

4. An active engine mount system according to claim 1, wherein said actuator is controlled by said control means to apply a force, which is substantially proportional to a vertical velocity of said vehicle body, to said vehicle body.

5. An active engine mount system according to claim 1, wherein said control means controls said actuator for adjusting a contribution of the mass of said engine to the mass of the vehicle body.

6. An active engine mount system according to claim 1, wherein said control means controls said actuator to apply force which is proportional to an absolute vertical velocity of said vehicle body, to said vehicle body.

7. An active engine mount system according to claim 1, wherein said control means adjusts the contribution of the mass of said engine to the mass of the vehicle body so as to control the vertical acceleration of the vehicle body according to the given condition of the road surface so as to cancel oscillatory movement of the vehicle body resulting from the given condition of the road surface.

8. A vehicle body motion control system, comprising:

a wheel suspension system supporting said vehicle body on a wheel;

an actuator interposed between an engine of the vehicle and said vehicle body for vertically displacing said engine relative to said vehicle body; and control means for controlling said actuator such that an acting amount of engine mass on said vehicle body is varied in accordance with traveling surface conditions on which the vehicle is traveling;

said wheel suspension system being an active suspension system; and said control means also controlling said active suspension system so as to control the vertical acceleration of said vehicle body in accordance with the traveling surface conditions on which the vehicle is traveling.

9. A vehicle body motion control system according to claim 8, wherein said actuator as controlled by said control means functions as either a semi-active engine mount system or a full active engine mount system, and said active suspension as controlled by said control means functions as either a semi-active wheel suspension system or a full active suspension system.

10. A vehicle body motion control system according to claim 8, wherein said control means comprises prediction control means for detecting a road condition ahead of said vehicle, and said control means controls said actuator according to the detected road condition ahead of said vehicle.

11. A vehicle body motion control system according to claim 8, further including means for detecting a vertical acceleration of said vehicle body, and said control means controls said actuator to apply a force, which is substantially proportional to a vertical velocity of said vehicle body, to said vehicle body.

12. An active engine mount system for a vehicle having an actuator interposed between an engine and a vehicle body for inertial adjustment of said engine relative to said vehicle body and control means for controlling the actuator, wherein:

said control means controls said actuator such that an acting amount of engine mass on said vehicle body is varied in accordance with traveling surface conditions on which the vehicle is traveling; and said control means comprising prediction control means for detecting a traveling surface condition ahead of said vehicle, and said actuator is controlled such that the acting amount of engine mass on said vehicle body is varied in accordance with the detected traveling surface condition ahead of the vehicle.

13. An active engine mount system according to claim 12, wherein said control means controls said actuator such that the acting amount of engine mass on said vehicle body is varied so as to control a vertical acceleration of said vehicle body in accordance with the traveling surface conditions.

14. An active engine mount system according to claim 12, wherein said engine mount system is a semi-active engine mount system or a full active engine mount system.

15. An active engine mount system according to claim 12, wherein said actuator is controlled to inertially adjust the engine position relative to the vehicle body so as to apply a force, which is substantially proportional to a vertical velocity of said vehicle body, to said vehicle body.

16. An active engine mount system according to claim 15, wherein said control means comprises means for detecting vertical acceleration of said vehicle body.

17. An active engine mount system according to claim 1, wherein said wheel suspension system is an active suspension system; and said control means, including said prediction control means, also controls said active suspension system according to the given condition of the road surface.

18. An active engine mount system according to claim 17, wherein said engine mount system consists of full active engine mount system and said active suspension system is a full active suspension system.

19. A vehicle body motion control system according to claim 8, wherein said actuator as controlled by said control means functions as a full active engine mount system and said active suspension as controlled by said control means functions as a full active suspension.

20. An active engine mount system according to claim 12, further including an active wheel suspension system supporting the vehicle body on a wheel, said control means also controls said active wheel suspension system in accordance with the traveling surface conditions on which the vehicle is traveling.

* * * * *

UNITED STATES PATENT AND TRADEMARK OFFICE
CERTIFICATE OF CORRECTION

PATENT NO. : 5,848,663
DATED : December 15, 1998
INVENTOR(S) : Nobuharu Kuriki

It is certified that error appears in the above-identified patent and that said Letters Patent is hereby corrected as shown below:

Title page, under "[56] References Cited", correct the spelling of "Ookley" to read --Oakley--.
Column 5, line 13, after "passive" insert a comma;
Column 5, Table (Figure 6) should read as shown below :

Table (Figure 6)

|  | (a) input from the road surface |
|---|---|
| conventional | (b) passive wheel suspension<br>(c) semi active wheel suspension<br>(d) prediction control + semi active wheel suspension |
| present invention | (e) prediction control + semi active wheel suspension + semi active engine mount<br>(f) prediction control + semi active wheel suspension + full active engine mount<br>(g) prediction control + full active wheel suspension + full active engine mount |

Signed and Sealed this

Eleventh Day of May, 1999

Attest:

Q. TODD DICKINSON

*Attesting Officer*

*Acting Commissioner of Patents and Trademarks*